United States Patent [19]
Kalebjian et al.

[11] Patent Number: 5,794,591
[45] Date of Patent: Aug. 18, 1998

[54] THROTTLE VALVE FOR AN INTERNAL COMBUSTION ENGINE

[75] Inventors: Christopher Joseph Kalebjian, Belleville; Catherine Ann Kerrigan, Plymouth, both of Mich.; Robert Sharples, Chelsmford, Great Britain; Wade Coots, Livonia; Thomas Daniel Wernholm, Northville, both of Mich.

[73] Assignee: Ford Motor Company, Dearborn, Mich.

[21] Appl. No.: 819,159

[22] Filed: Mar. 17, 1997

[51] Int. Cl.⁶ .................. F02D 9/08; B23P 17/00
[52] U.S. Cl. ............. 123/337; 29/890.127; 29/890.132
[58] Field of Search .................. 123/337, 336; 251/305; 137/68.19; 29/888.4, 890.127, 890.128, 890.132, 527.2

[56] References Cited

U.S. PATENT DOCUMENTS

| | | | |
|---|---|---|---|
| 4,205,947 | 6/1980 | Ruhl et al. | 417/199 A |
| 4,241,897 | 12/1980 | Maezawa | 137/375 |
| 4,259,980 | 4/1981 | Muller | 251/229 |
| 4,489,917 | 12/1984 | Baumann | 251/305 |
| 4,616,504 | 10/1986 | Overcash et al. | 73/118.1 |
| 4,740,347 | 4/1988 | Sloan, Jr. et al. | 264/262 |
| 5,098,064 | 3/1992 | Daly et al. | 251/306 |
| 5,177,866 | 1/1993 | Bennett et al. | 29/890.127 |
| 5,275,375 | 1/1994 | Semence | 251/308 |
| 5,370,148 | 12/1994 | Shafer | 137/15 |
| 5,388,807 | 2/1995 | Habicht | 251/306 |
| 5,409,654 | 4/1995 | Platusich | 264/161 |
| 5,529,743 | 6/1996 | Powell | 264/513 |
| 5,531,248 | 7/1996 | Pearson et al. | 137/625.46 |
| 5,546,900 | 8/1996 | Adamek et al. | 123/184.55 |
| 5,564,679 | 10/1996 | Ericson et al. | 251/308 |

*Primary Examiner*—Tony M. Argenbright
*Assistant Examiner*—Hieu T. Vo
*Attorney, Agent, or Firm*—Neil P. Ferraro

[57] ABSTRACT

A throttle valve for an internal combustion engine includes a body having a throttle bore defining an axis. A throttle plate for controlling air flow through the throttle valve is molded within the throttle bore, thereby providing a relatively exact throttle plate to throttle bore positional relationship The throttle plate may be integrally molded within the throttle bore and attached to the throttle body. The throttle plate is subsequently detached from the throttle body for relative rotation within the throttle bore. To facilitate detaching of the throttle plate, the plate may be weakened about is periphery. The throttle plate may be also formed with a bend for reducing throttle plate sticking upon rotation from an idle position and for controlling air leakage when the throttle plate is in the idle position. Further, the throttle plate may include a wedge to control air flow through the throttle bore and reinforcing ribs to further control the deflection of the throttle plate.

19 Claims, 3 Drawing Sheets

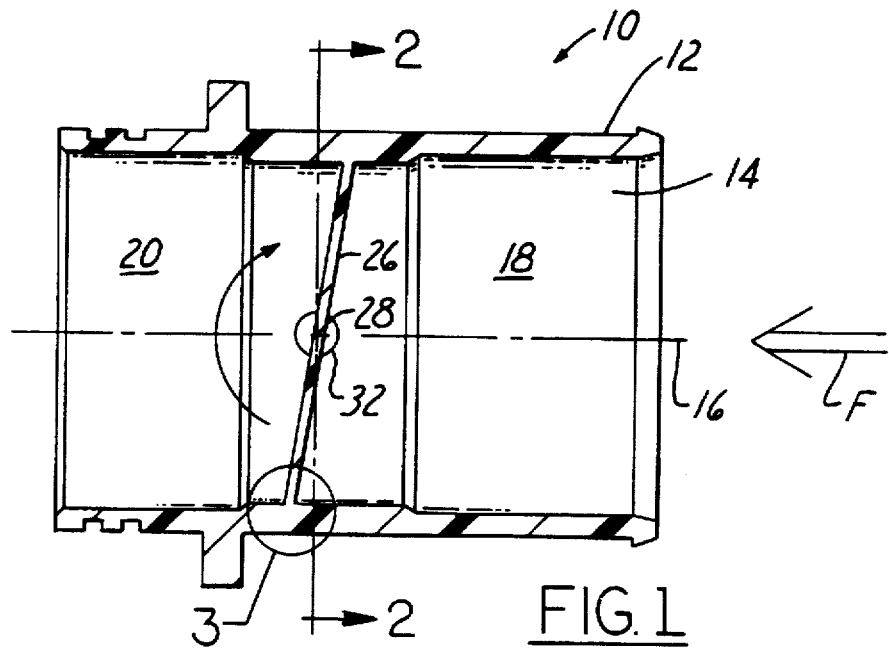
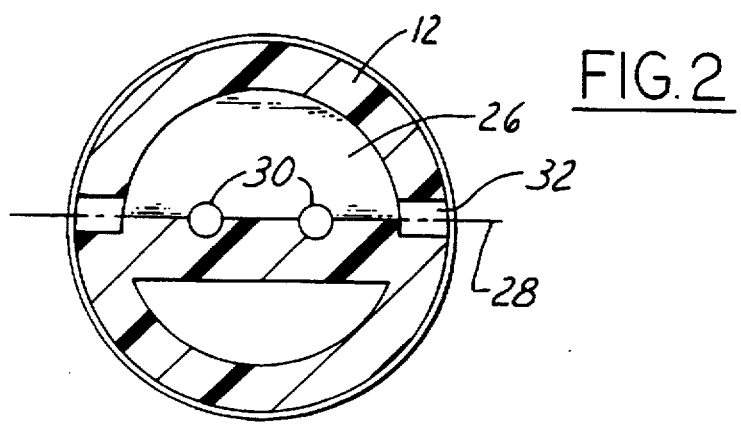
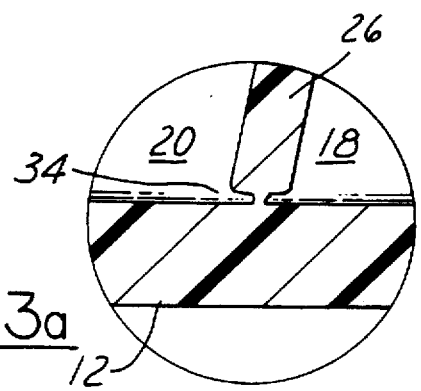
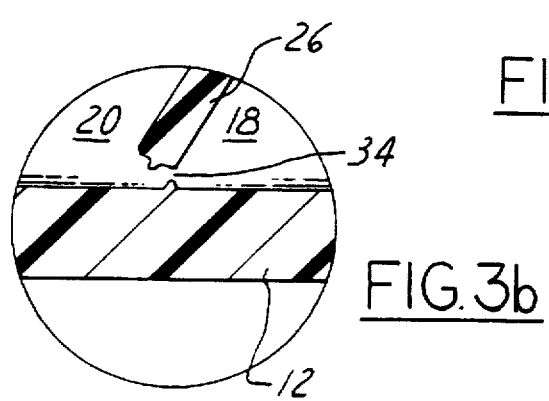

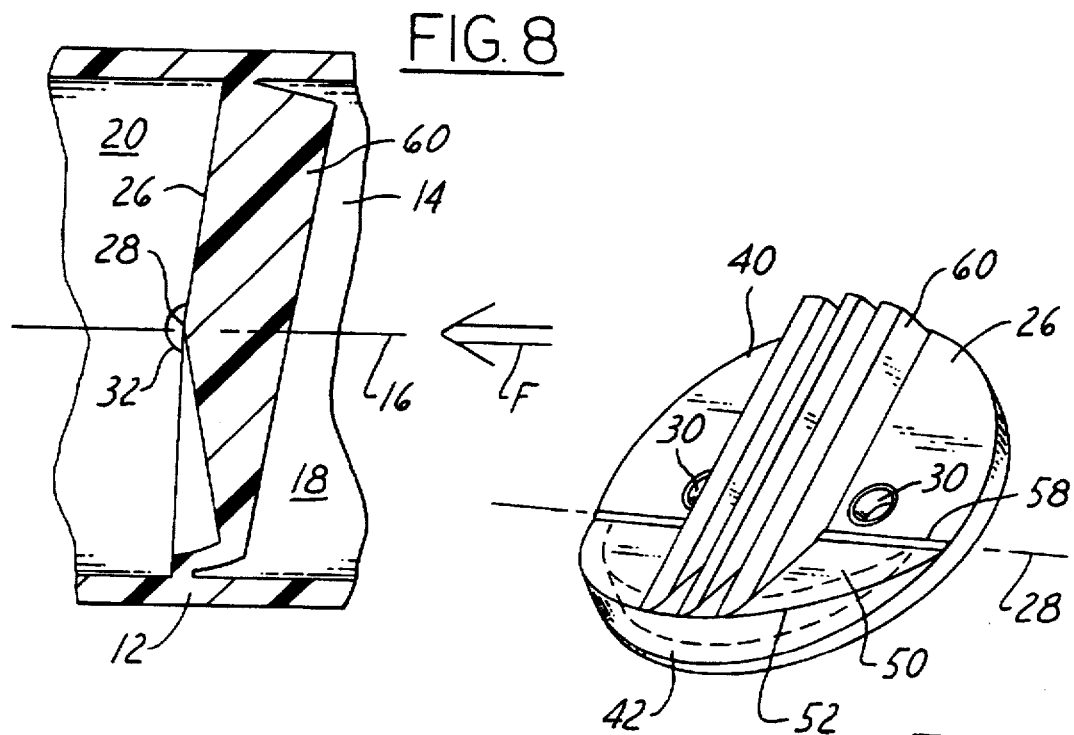
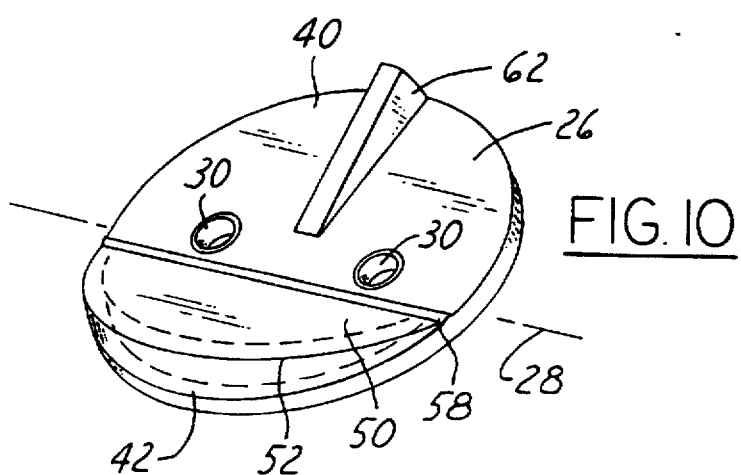

THROTTLE VALVE FOR AN INTERNAL COMBUSTION ENGINE

FIELD OF THE INVENTION

This invention relates to induction systems for internal combustion engines, and more particularly to molded throttle valves for induction systems.

BACKGROUND OF THE INVENTION

Conventional automotive throttle valves include a body having a throttle bore passing therethrough and a throttle plate fitted within the throttle bore. The throttle plate is attached to a shaft so that the throttle plate may rotate relative to the throttle bore, thereby controlling air flow through the throttle valve. Typically, the body is cast from a metal such as aluminum and the plate is stamped from sheet metal such as brass. The throttle bore is subsequently machined to conform to the diameter of the throttle plate, thereby obtaining a precise close-fitting relationship. If the throttle plate is not properly fit within the bore, a high potential for air leakage or plate sticking exists.

Automotive engineers have been exploring the use of plastic in many automotive components including throttle valves. The inventors of the present invention have recognized certain disadvantages with plastic throttle valves. For example, a correct throttle bore/throttle plate positional relationship is difficult to achieve and maintain using plastic parts because of bore out-of-roundness and material shrinkage. To accommodate for this deviation, as in the case of using metal throttle bodies, the throttle body must be machined after molding.

In addition, under the effects of engine vacuum, plastic throttle plates deflect significantly more than metal throttle plates. This deflection may cause the plate to contact the bore wall on the upstream rotating side of the plate, thereby creating an undesirable plate sticking condition. This deflection may also cause the plate to deflect away from the bore wall on the downstream rotating side of the plate, thereby creating an unacceptable air leak at engine idle. Adjustments of the throttle plate relative to the throttle bore enable the plate to be rotated away from the bore wall to prevent sticking on the upstream rotating side of the plate, but further increase the air gap on the downstream rotating side of the plate.

SUMMARY OF THE INVENTION

An object of the present invention is to provide a throttle valve requiring no secondary machining, while reducing the potential for air leakage or plate sticking. This object is achieved, and disadvantages of prior art approaches are overcome by providing a novel molded throttle valve for an internal combustion engine induction system. The throttle valve includes a throttle body having a throttle bore defining an axis and a throttle plate for controlling air flow through the throttle valve. The throttle plate is molded within the throttle bore, thereby providing a relatively exact throttle plate to throttle bore positional relationship.

In a preferred embodiment, the throttle plate is integrally molded within the throttle bore and attached to the throttle body. The throttle plate is subsequently detached from the throttle body for relative rotation within the throttle bore. To facilitate detaching of the throttle plate from the throttle bore, the throttle plate may include a weakened zone about its periphery. This weakened zone may include a reduced cross-sectional area.

To limit plate sticking and air leakage, a plastic throttle plate may be formed with a "dog-leg" bend. That is, the throttle plate has an upstream rotating portion and a downstream rotating portion. The upstream rotating portion is bent toward the upstream side of the throttle bore and the downstream rotating portion is bent toward the downstream side of the throttle bore when the throttle plate is in an idle position. To form the "dog-leg", the upstream rotating portion has a greater bend than the downstream rotating portion, thereby reducing throttle plate sticking upon rotation from the idle position and controlling air leakage when the throttle plate is in the idle position, respectively. The throttle plate may also include reinforcing ribs to further limit deflection and may also include a wedge formed on an upstream side of the downstream rotating portion to improve slow speed driveability.

An advantage of the present invention is that a low cost throttle valve requiring no secondary machining is provided.

Another advantage of the present invention is that a relatively precise fitting throttle plate/throttle bore positional relationship is provided.

Another, more specific, advantage of the present invention is that part-to-part variation is reduced, thereby increasing the quality of each throttle valve because each throttle body has a corresponding precisely fitting throttle plate.

Yet another advantage of the present invention is that air leakage and throttle plate sticking is controlled.

Other objects, features and advantages of the present invention will be readily appreciated by the reader of this specification.

BRIEF DESCRIPTION OF THE DRAWINGS

The invention will now be described, by way of example, with reference to the accompanying drawings in which:

FIG. 1 is a cross-sectional view of a throttle valve according to the present invention;

FIG. 2 is a cross-sectional view taken along line 2—2 of FIG. 1;

FIG. 3a is an enlarged view of the area encircled by line 3 of FIG. 1;

FIG. 3b is an enlarged view of the area encircled by line 3 of FIG. 1 after detaching the throttle plate;

FIGS. 8 and 9 show a fourth embodiment of a throttle valve according to the present invention; and, FIG. 10 shows a fifth embodiment of a throttle plate for a throttle valve according to the present invention.

DETAILED DESCRIPTION OF THE PREFERRED EMBODIMENT

Figure 4:
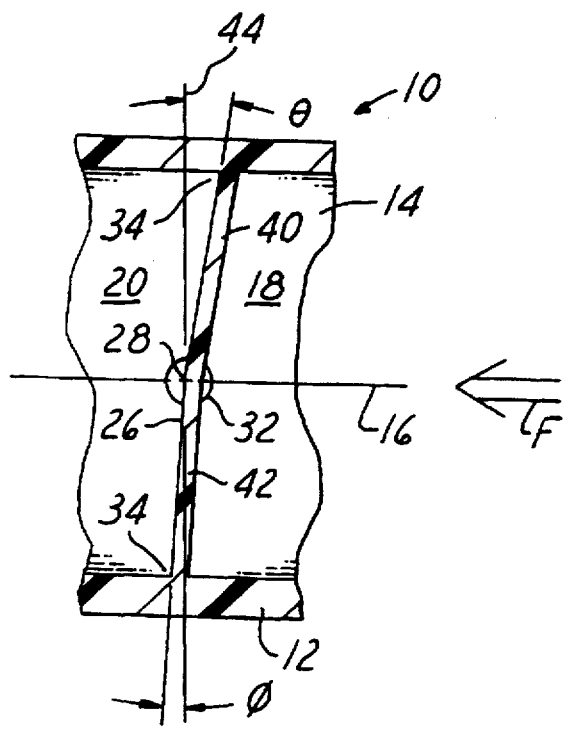
FIG. 4 shows a second embodiment of a throttle valve according to the present invention.

Throttle valve 10, shown in FIGS. 1–4, includes body 12 having throttle bore 14 passing therethrough and defining axis 16. Body 12 is adapted to be connected to the engine induction system (not shown) such that upstream side 18 of bore 14 is coupled to the air intake (not shown) and downstream side 20 is coupled to the engine intake manifold (not shown). Throttle valve 10 includes throttle plate 26 for controlling air flow through throttle valve 10. According to the present invention, throttle plate 26 is molded within bore 14 such that throttle plate 26 conforms nearly exactly to the shape of bore 14. In this example, the molding process may include a method wherein throttle body 12 with bore 14 is molded during a first molding operation and throttle plate 26 is subsequently molded within bore 14 in a second molding operation. Here, throttle bore 14 acts as the mold cavity for at least the periphery of throttle plate 26. Thus, a relatively precise throttle plate/throttle bore positional relationship may be obtained.

In a preferred embodiment, throttle plate 26 is integrally molded within throttle bore 14 and attached to throttle body 12. Throttle plate 26 is subsequently detached from throttle body 12, thereby providing a relatively exact throttle plate to throttle bore positional relationship. Once detached, throttle plate 26 may rotate about axis 28 to control flow, shown as arrow F, through throttle bore 14.

As is well known to those skilled in the art, throttle plate 26 may be attached a throttle shaft (not shown) by way of mounting holes 30 formed in plate 26. The throttle shaft passes through hole 32 formed within body 12 and is connected to a suitable actuation means to control the opening and closing of throttle plate 26 relative to throttle bore 14. Further, those skilled in the art will recognize in view of this disclosure that throttle plate 26 may be generally elliptically shaped such that the major diameter of plate 26 is larger than the diameter of bore 14.

Throttle valve 10 is preferably molded from plastic. However, those skilled in the art will recognize in view of this disclosure that any material suitable for molding throttle plate 26 within throttle bore 14 may be used. As shown in FIGS. 3a and 3b, throttle bore 14 defines periphery 34 of throttle plate 26, which may have a weakened zone to facilitate detaching of throttle plate 26 from body 12. In a preferred embodiment, this may be accomplished by reducing the cross-sectional area of throttle plate 26 at periphery 34 (see FIG. 3a). That is, during molding, a core (not shown) is inserted into the mold and occupies the space that will later define upstream and downstream sides 18, 20 of bore 14. These cores (not shown) may be formed such that plate 26 will include the area of reduced cross-section at its periphery. Those skilled in the art will recognize in view of this disclosure that any suitable means may be used to create a weakened zone at periphery 34 of plate 26 to facilitate detaching of plate 26 therefrom. Accordingly, in an alternative embodiment, during molding, the material content at periphery 34 may be changed from the material content forming the remainder of the throttle plate 26 and body 12 so as to produce the weakened zone. That is, assuming that the throttle valve 10 is molded from a fiber-filled plastic, it may be desirable to control the fiber size, shape and content in the area of periphery 34 so as to create the weakened zone. It is also to be appreciated that any suitable detaching method may be used to detach plate 26 from body 12. Such detaching methods may include heating periphery 34, cutting periphery 34 or simply pushing plate 26 so that plate 26 fractures at periphery 34 (see FIG. 3b). Thus, according to the present invention, a relatively precise throttle plate/throttle bore positional relationship may be obtained.

Turning now to FIG. 4, a second embodiment according to the present invention is shown. For the sake of clarity, throttle valve 10 is shown with throttle plate 26 integrally molded to throttle body 12 before detaching therefrom. In this embodiment, throttle plate 26 includes upstream rotating portion 40 and downstream rotating portion 42. Upstream rotating portion 40 is bent toward upstream side 18 of throttle bore 14 when throttle plate 26 is in an idle position (as shown). As used herein, "idle position" refers to the position when throttle plate 42 is closed such that substantially no air flows through throttle valve 10. Downstream rotating portion 42 is similarly bent toward downstream side 20 of throttle bore 14 when throttle plate 26 is in the idle position. According to the present invention, upstream rotating portion 40 has a greater bend then downstream rotating portion 42 to form a "dog-leg" in plate 26, thereby reducing throttle plate sticking upon rotation from the idle position and controlling air leakage when the throttle plate is in the idle position, respectively.

When throttle plate 26 is detached from throttle body 12, and the engine (not shown) is operating, a vacuum exists on downstream side 20, which may cause throttle plate 26 to deflect at periphery 34 toward downstream side 20 and subsequently cause plate 26 to contact the inner wall of bore 14. This may cause plate 26 to become lodged against the inner wall of bore 14. To limit plate sticking as throttle plate 26 rotates from the idle position, it is preferable that upstream rotating portion 40 be bent toward upstream side 18. Upstream rotating portion 40 is sufficiently bent toward upstream side 18 such that the rate of breakaway of plate 26 from the inner wall of bore 14 increases with a greater bend in plate 26, thereby reducing plate sticking as plate 26 begins to rotate. Further, to reduce the air gap when throttle plate 26 is in the idle position (i.e., to limit throttle plate 26 deflection), it is preferable that downstream rotating portion 42 have slightly less bend than upstream rotating portion 40. If no "dog-leg" bend exists, downstream rotating portion 42 would deflect by an amount equal to that of upstream rotating portion 42, causing an excessive air gap. By providing downstream rotating portion 42 with a slightly less bend than upstream rotating portion 40, the amount of deflection across the line of flow is comparatively reduced, thereby controlling the resulting air gap. Accordingly, in this example, angle θ (which represents the angle that upstream rotating portion 40 is bent from line 44) is greater than angle ø (which represents the angle that downstream rotating portion 42 is bent from line 44). In a preferred embodiment, angle θ is about 8° and angle ø is about 2°.

This "dog-leg" feature serves an additional function of aiding the closure of throttle plate 26 within bore 14. Engine vacuum, acting on downstream side 20, aids in closing plate 26 due to force imbalance about the pivot point of the throttle shaft (not shown). This is due to the fact that, because of the "dog-leg", the area on the downstream side of upstream rotating portion 40 of plate 26 is greater than the area on the downstream side of the downstream rotating portion 42 of plate 26. The force imbalance is created to obtain a self-closing feature of plate 26, which is desirable at low engine speeds. This feature obviates the need to offset the throttle shaft from axis 16.

Figure 5:
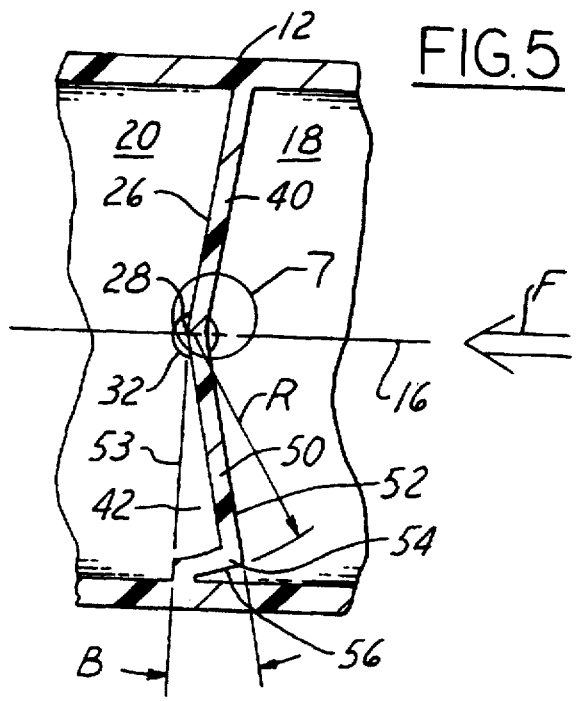
FIGS. 5 and 6 show a third embodiment of a throttle valve according to the present invention.
Figure 6:
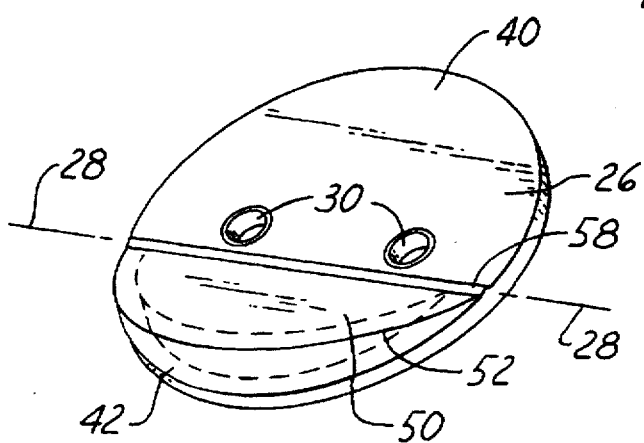
Figure 7:
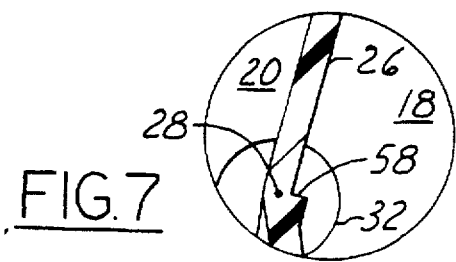
FIG. 7 is an enlarged view of the area encircled by line 7 of FIG. 5.

Referring now to FIGS. 5–7, a third embodiment according to the present invention is shown. For the sake of clarity, in FIG. 5, throttle valve 10 is shown with throttle plate 26 integrally molded to throttle body 12 before detaching therefrom. In this embodiment, throttle plate 26 is formed with wedge 50 formed on upstream facing surface 52 of downstream rotating portion 42 of throttle plate 26. For molding purposes, the underside of wedge 50 (on downstream facing surface 53 of downstream rotating portion 42 of throttle plate 26) is hollow so as to create a uniformly thick throttle plate 26 for molding purposes. Of course, those skilled in the art in view of this disclosure will recognize that wedge 50 may be formed as a solid member. In a preferred embodiment, wedge 50 extends toward upstream side 18 of throttle bore 14 at an angle of about 14° (shown an angle β) from downstream facing surface 53 of downstream rotating portion 42. Further, wedge 50 includes relief 54 formed on outer edge 56 thereof. Relief 54 has a radius "R" sufficient to allow throttle plate 26 to rotate about axis 28 within throttle bore 14. Wedge 50 creates a flow restriction as throttle plate 26 begins to open from the idle position. Thus, a large amount of pedal movement, or throttle plate movement, is required to provide a relatively small amount of air flow. This improves slow speed driveability. If, on the other hand, a performance engine is required, plate 26 would be formed without wedge 50, resulting in a relatively large amount of air flow with comparatively little plate movement.

Referring now in particular to FIG. 7, in a preferred embodiment, throttle plate 26 is shown formed with ledge 58 adjacent axis of rotation 28. Ledge 58 facilitates the location of the throttle shaft (not shown) relative to throttle plate 26.

Referring now to FIGS. 8–10, fourth and fifth embodiments according to the present invention are shown. For the sake of clarity, in FIG. 8, throttle valve 10 is shown with throttle plate 26 integrally molded to throttle body 12 before detaching therefrom. In these embodiments, throttle plate 26 includes reinforcing ribs 60, 62 formed on the downstream side of plate 26. Reinforcing ribs 60, 62 further inhibit plate deflection of throttle plate 26. In the example shown in FIGS. 8 and 9, a plurality of reinforcing ribs 60 extends across the entire diameter of throttle plate 26. Each rib 60 has a generally uniform height and width for at least the portion formed on upstream rotating portion 40. In the example shown in FIG. 10, throttle plate 26 is formed with reinforcing ribs 62 formed substantially on upstream rotating portion 40 and which generally has a tapered height to give maximum strength where maximum deflection is likely to occur. In addition, reinforcing rib 62 does not extend across the entire diameter of plate 26, thereby allowing throttle shaft (not shown) to extend across the diameter of plate 26 along axis of rotation 28.

While the best mode in carrying out the invention has been described in detail, those familiar with the art to which this invention relates will recognize various alternative designs and embodiments, including those mentioned above, in practicing the invention that has been defined by the following claims.

What is claimed is:

1. A molded throttle valve for an internal combustion engine induction system comprising:
   a throttle body having a throttle bore defining an axis; and,
   a throttle plate for controlling air flow through said throttle valve, with said throttle plate having a periphery and being integrally molded within said throttle bore and attached to said throttle body at said periphery, thereby providing a relatively exact throttle plate to throttle bore positional relationship, with said throttle plate being adapted for subsequent detachment at said periphery from said throttle body for relative motion within said throttle bore.

2. A throttle valve according to claim 1 wherein said periphery is weakened to facilitate detachment of said throttle plate from said throttle body.

3. A throttle valve according to claim 2 wherein said weakened periphery comprises a cross sectional thickness of said throttle plate at said periphery being less than a cross sectional thickness of the remainder of said throttle plate.

4. A throttle valve according to claim 1 wherein said throttle bore has an upstream side and a downstream side and wherein said throttle plate has an axis of rotation, an upstream rotating portion and a downstream rotating portion, with said upstream rotating portion being bent toward said upstream side when said throttle plate is in an idle position and with said downstream rotating portion being bent toward said downstream side when said throttle plate is in said idle position, with said upstream rotating portion having a greater bend than said downstream rotating portion, thereby reducing throttle plate sticking upon rotation from said idle position and controlling air leakage when said throttle plate is in said idle position, respectively.

5. A throttle valve according to claim 4 wherein said upstream rotating portion is bent at an angle of about 8° from a line extending perpendicular to both said bore axis and said axis of rotation and wherein said downstream rotating portion is bent at an angle of about 2° from said line extending perpendicular to both said bore axis and said axis of rotation.

6. A throttle valve according to claim 4 wherein said throttle plate has an upstream facing surface and a downstream facing surface, with said throttle plate comprising a wedge formed on said upstream facing surface of said downstream rotating portion of said throttle plate.

7. A throttle valve according to claim 6 wherein said wedge extends toward said upstream side of said throttle bore at an angle of about 14° from said downstream facing surface.

8. A throttle valve according to claim 6 wherein said wedge is formed with a relief on an outer edge thereof adjacent said throttle bore to allow said throttle plate to rotate within said throttle bore.

9. A throttle valve according to claim 1 wherein said throttle plate is formed with at least one reinforcing rib for inhibiting deflection of said throttle plate during engine operation.

10. A molded plastic throttle plate for a throttle valve of an internal combustion engine induction system, with the throttle valve having a throttle bore defining an axis, an upstream side and a downstream side, with said throttle plate comprising:
    an axis of rotation;
    an upstream rotating portion bent toward the upstream side of the throttle bore when installed in an idle position therein; and,
    a downstream rotating portion bent toward the downstream side of the throttle bore when installed in the idle position therein, with said upstream rotating portion having a greater bend than said downstream rotating portion, thereby reducing throttle plate sticking upon rotation from the idle position and controlling air leakage when said throttle plate is in the idle position, respectively.

11. A throttle plate according to claim 10 wherein said upstream rotating portion is bent at an angle of about 8° from a line extending perpendicular to both said bore axis and said axis of rotation and wherein said downstream rotating portion is bent at an angle of about 2° from said line extending perpendicular to both said bore axis and said axis of rotation.

12. A throttle plate according to claim 10 wherein said throttle plate has an upstream facing surface and a downstream facing surface, with said throttle plate comprising a wedge formed on said upstream facing surface of said downstream rotating portion of said throttle plate.

13. A throttle plate according to claim 12 wherein said wedge extends toward the upstream side of the throttle bore at an angle of about 14° from said downstream facing surface.

14. A throttle plate according to claim 12 wherein said wedge is formed with a relief on an outer edge thereof adjacent the throttle bore when installed therein to allow said throttle plate to rotate within the throttle bore.

15. A throttle plate according to claim 10 wherein said throttle plate is formed with a means for locating a throttle shaft relative to said throttle plate.

16. A throttle plate according to claim 15 wherein said means for locating comprises a ledge formed adjacent said axis of rotation.

17. A throttle plate according to claim 10 wherein said throttle plate is formed with at least one reinforcing rib for inhibiting deflection of said throttle plate during engine operation.

18. A throttle plate according to claim 10 wherein said throttle plate is integrally molded within the throttle bore and attached to the throttle body, with said throttle plate being subsequently detached from said throttle body for relative rotation within said throttle bore, thereby providing a relatively exact throttle plate to throttle bore positional relationship.

19. A method of forming a throttle valve comprising the steps of:

forming a body having a throttle bore, with said throttle bore defining an axis;

integrally molding a throttle plate, defining a periphery, within said bore and attached to said throttle body at said periphery; and, detaching said throttle plate at said periphery from said throttle body for relative rotation within said throttle bore, thereby providing a relatively exact throttle plate to throttle bore positional relationship.

* * * * *

UNITED STATES PATENT AND TRADEMARK OFFICE
CERTIFICATE OF CORRECTION

PATENT NO. : 5,794,591
DATED : august 18, 1998
INVENTOR(S) : Christopher Joseph Kalebjian, et. al.

It is certified that error appears in the above-identified patent and that said Letters Patent is hereby corrected as shown below:

Title page, item [75], inventors: add --Donald McAlpine Lawrence, Redford, Mich. --

Signed and Sealed this

Twelfth Day of October, 1999

*Attest:*

Q. TODD DICKINSON

*Attesting Officer*  Acting Commissioner of Patents and Trademarks